US012142116B2

(12) United States Patent
Woo et al.

(10) Patent No.: US 12,142,116 B2
(45) Date of Patent: Nov. 12, 2024

(54) AUTOMATED TELLER MACHINE

(71) Applicant: HYOSUNG TNS INC., Seoul (KR)

(72) Inventors: Hyun Sik Woo, Seoul (KR); Dongkyung Kim, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/541,185

(22) Filed: Dec. 15, 2023

(65) Prior Publication Data

US 2024/0221471 A1 Jul. 4, 2024

(30) Foreign Application Priority Data

Dec. 28, 2022 (KR) ........................ 10-2022-0187843
Dec. 28, 2022 (KR) ........................ 10-2022-0187883

(51) Int. Cl.

*G07F 19/00* (2006.01)
*G07D 11/17* (2019.01)
*G07D 11/18* (2019.01)

(52) U.S. Cl.

CPC ........... *G07F 19/202* (2013.01); *G07D 11/17* (2019.01); *G07D 11/18* (2019.01); *G07F 19/203* (2013.01)

(58) Field of Classification Search

CPC ..... G07F 19/202; G07F 19/203; G07D 11/17; G07D 11/18; G07D 11/40
See application file for complete search history.

(56) References Cited

U.S. PATENT DOCUMENTS

2015/0100480 A1* 4/2015 Colvin .................... G07D 11/40 705/39
2016/0163160 A1* 6/2016 Hosokawa ............ G07F 19/202 700/242
2017/0249807 A1* 8/2017 Kanbayashi ........... G07D 11/18
2021/0295633 A1* 9/2021 Tachibana ............ G07D 11/235

* cited by examiner

*Primary Examiner* — Jamara A Franklin

(74) *Attorney, Agent, or Firm* — BACON & THOMAS, PLLC

(57) ABSTRACT

An automated teller machine includes: a bundle storage unit into which a bundle of paper mediums are input and which separates the bundle of paper mediums into individual sheets and conveys the paper mediums individually; a paper medium alignment unit that aligns and conveys the paper mediums conveyed individually from the bundle storage unit; a discrimination unit that discriminates the aligned paper mediums conveyed individually from the paper medium alignment unit; a normal banknote temporary holding unit that temporarily holds normal banknotes discriminated in the discrimination unit and conveyed individually; and a rejected banknote temporary holding unit that temporarily holds rejected banknotes discriminated in the discrimination unit and conveyed individually.

19 Claims, 9 Drawing Sheets

AUTOMATED TELLER MACHINE

TECHNICAL FIELD

The present disclosure relates to an automated teller machine.

BACKGROUND

In general, financial automation devices such as a cash dispenser unit (CDU) and a bill recycling machine (BRM), which have been developed to provide most unmanned financial services except consulting services, are so-called automated teller machines (ATMs).

In a conventional automated teller machine, rejected banknotes, which are discriminated as counterfeit banknotes or damaged banknotes rather than normal banknotes in a discrimination unit and conveyed individually, are collected and stacked to be conveyed to a medium deposit unit to be returned to a customer. Accordingly, in the conventional automated teller machine, a relatively large space where rejected banknotes conveyed individually from the discrimination unit are collected and stacked needs to be provided separately, and a separate conveyance path needs to be provided to convey the stacked rejected banknotes to the medium deposit unit at once. Since the stacked rejected banknotes are conveyed to the medium deposit unit at once through the separate conveyance path, the rejected banknotes need to be conveyed from the medium deposit unit to the discriminating unit in order to reclassify the rejected banknotes into counterfeit banknotes and damaged banknotes.

Meanwhile, the normal banknotes discriminated by the discrimination unit of the automated teller machine are stored in a cassette accommodated in the automated teller machine. The cassette is detachably accommodated in a cassette accommodation frame, and the cassette accommodation frame is detachably accommodated in the automated teller machine. In addition, the cassette has an open surface that is opened and closed by a cassette opening door. Accordingly, in a state in which the cassette is accommodated in the cassette accommodation frame with the open surface closed by the cassette opening door, by accommodating the cassette accommodation frame in the automated teller machine, the cassette is accommodated in the automated teller machine. Further, in a state in which the cassette accommodation frame is separated from the automated teller machine and the cassette opening door is opened to open the open surface of the cassette, the normal banknotes stored in the cassette are drawn out.

In the conventional automated teller machine, the cassette is detachably accommodated in the cassette accommodation frame by being moved back and forth. In addition, the cassette has an open front surface and the cassette opening door is rotated horizontally to open and close the open front surface of the cassette. In other words, the direction in which the cassette is detachably accommodated in the cassette accommodation frame and the direction in which the cassette opening door opens and closes the open front surface of the cassette are the same. Accordingly, when the open front surface of the cassette is opened by rotation of the cassette opening door in a state in which the cassette accommodation frame is detached from the automated teller machine, the cassette can be detached from the cassette accommodation frame. When the cassette accommodation frame is accommodated in the automated teller machine in the state in which the cassette is detached from the cassette accommodation frame, the cassette is not activated.

SUMMARY

In view of the above, the present disclosure provides an automated teller machine which does not require a separate, relatively large space where rejected banknotes are collected and stacked, and a separate conveyance path for conveying the stacked rejected banknotes at once, thereby reducing the size thereof, simplifying the conveyance path for paper mediums, and reducing the processing time for paper mediums.

In addition, embodiments of the present disclosure provide an automated teller machine which prevents a cassette from separating from a cassette accommodation frame during the process of drawing out normal banknotes from the cassette, thereby minimizing the case where the cassette becomes inoperable.

In accordance with a first embodiment of the present disclosure, there is provided an automated teller machine including: a bundle storage unit into which a bundle of paper mediums are input and which separates the bundle of paper mediums into individual sheets and conveys the paper mediums individually; a paper medium alignment unit that aligns and conveys the paper mediums conveyed individually from the bundle storage unit; a discrimination unit that discriminates the aligned paper mediums conveyed individually from the paper medium alignment unit; a normal banknote temporary holding unit that temporarily holds normal banknotes discriminated in the discrimination unit and conveyed individually; and a rejected banknote temporary holding unit that temporarily holds rejected banknotes discriminated in the discrimination unit and conveyed individually.

In accordance with a second embodiment of the present disclosure, there is provided an automated teller machine including: an upper body; an upper module which is at least partially accommodated within the upper body and includes an upper conveyance path for paper mediums to be deposited, discriminated, and sorted; a lower body supporting the upper body; and a lower module which is detachably accommodated within the lower body and in which at least some of the paper mediums sorted in the upper module is conveyed and stored; wherein the lower module includes: a cassette accommodation frame detachably accommodated within the lower body; a lower conveyance path connected to the upper conveyance path to receive the paper mediums from the upper module; a lower conveyance module which opens and closes an open surface of the cassette accommodation frame and in which at least a portion of the lower conveyance path is disposed; and a cassette which is detachably accommodated inside the cassette accommodation frame through the open surface of the cassette accommodation frame and connected to the lower conveyance path to store the paper mediums, the cassette including a cassette body for storing the paper mediums and a cassette opening/closing door configured to open and close an open surface of the cassette body, and wherein a direction in which the cassette is detachably accommodated inside the cassette accommodation frame and a direction in which the cassette opening/closing door opens and closes the open surface of the cassette body are different from each other.

According to the embodiments of the present disclosure, a separate, relatively large space where rejected banknotes are collected and stacked is not required, and a separate conveyance path for conveying the stacked rejected banknotes at once is not required, thereby reducing the size of the automated teller machine, simplifying the conveyance path for paper mediums, and reducing the processing time for paper mediums.

Further, according to the embodiments of the present disclosure, it is possible to prevent the cassette from separating from the cassette accommodation frame during the process of drawing out normal banknotes from the cassette, thereby minimizing the case where the cassette becomes inoperable.

DETAILED DESCRIPTION

Hereinafter, specific embodiments for implementing the technical ideas of the present disclosure will be described in detail with reference to the drawings.

Figure 1:
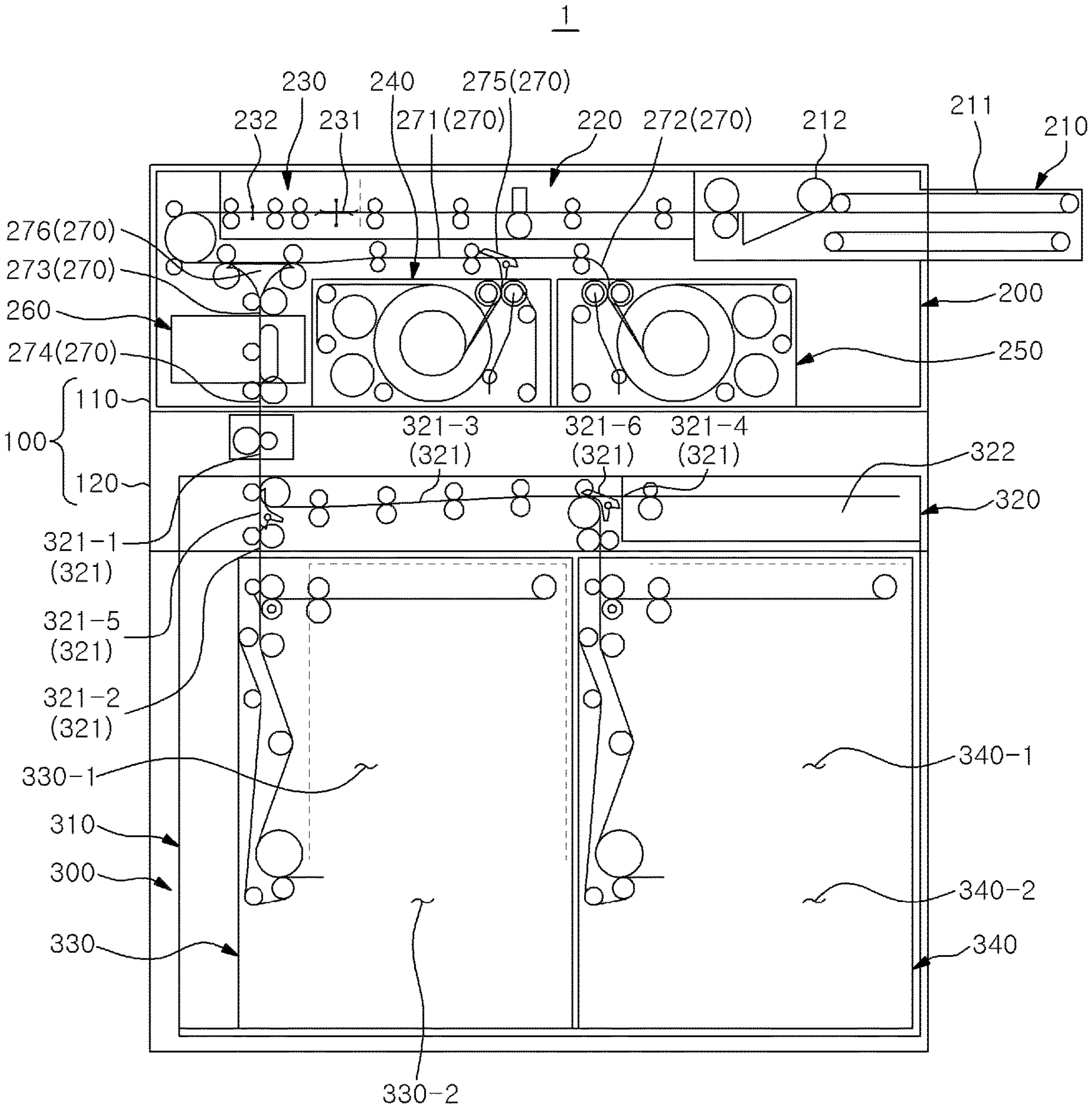
FIG. 1 is a diagram showing an automated teller machine according to one embodiment of the present disclosure.
Figure 2:
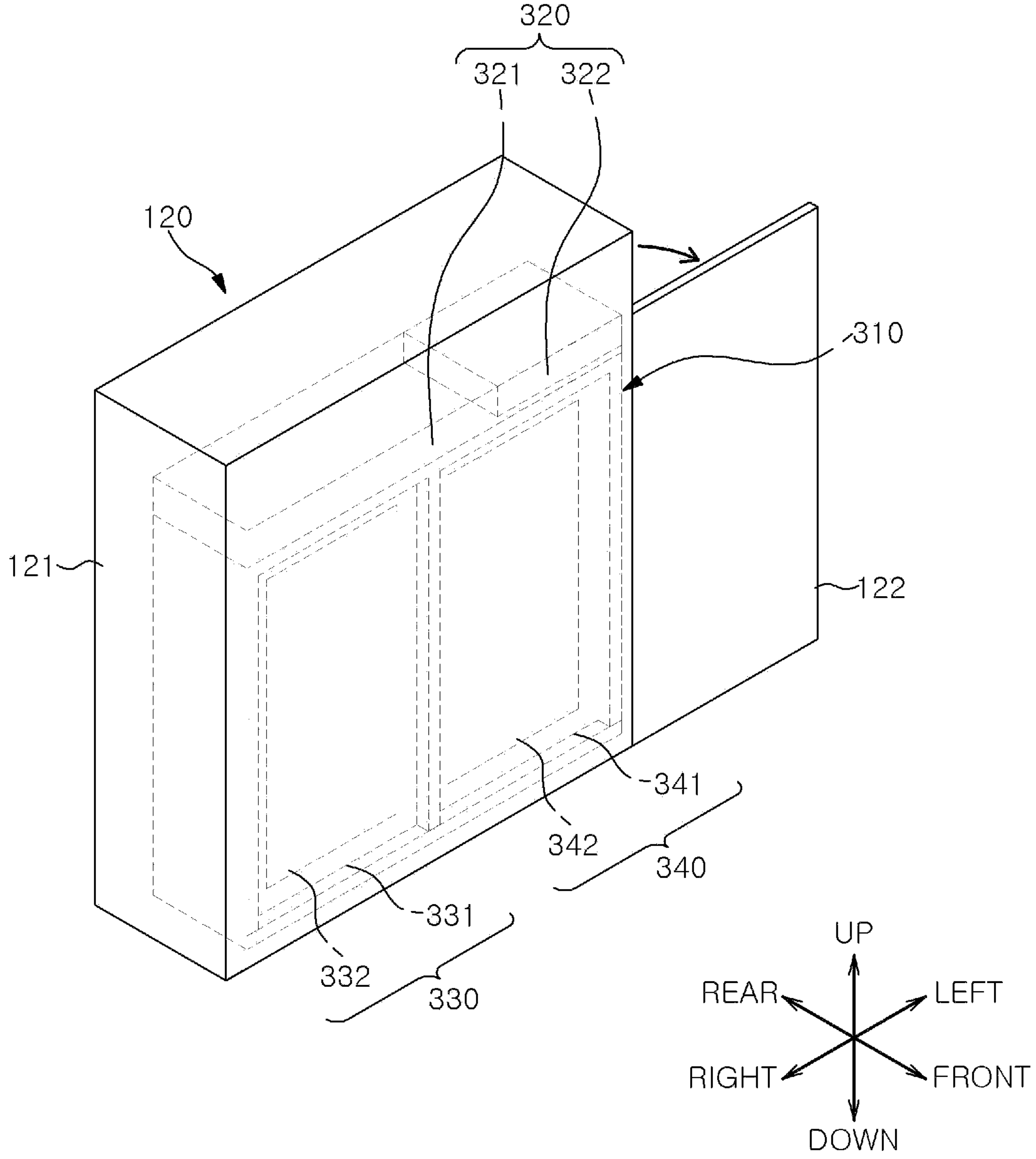
FIG. 2 is a diagram showing a lower body opening/closing door of a lower body of the automated teller machine according to one embodiment of the present disclosure.

Referring to FIGS. 1 and 2, an automated teller machine 1 according to one embodiment of the present disclosure may include a device body 100, an upper module 200, and a lower module 300.

The device body 100 may accommodate at least a portion of the upper module 200 therein and may detachably accommodate the lower module 300 therein. The device body 100 may include an upper body 110 and a lower body 120.

The upper body 110 may accommodate at least a portion of the upper module 200 therein. A space in which the upper module 200 can be accommodated may be formed inside the upper body 110. The upper body 110 may be supported by the lower body 120.

The lower body 120 supports the upper body 110 and may detachably accommodate the lower module 300 therein. A space in which the lower module 300 can be accommodated may be formed inside the lower body 120. The lower body 120 may include a lower body frame 121 and a lower body opening/closing door 122.

The lower body frame 121 may accommodate the lower module 300 therein. One surface of the lower body frame 121 is open, and the lower body opening/closing door 122 may be configured to open and close the open surface of the lower body frame 121. In a state where the open surface of the lower body frame 121 is opened by the lower body opening/closing door 122, the lower module 300 may be accommodated inside the lower body frame 121 or taken out from the inside of the lower body frame 121. After the lower module 300 is accommodated inside the lower body frame 121, the open surface of the lower body frame 121 may be closed by the lower body opening/closing door 122. For example, a left side surface of the lower body frame 121 may be open. In addition, since the lower body opening/closing door 122 is configured to be rotatable about a rotation axis (not shown) extending in an up-down direction between a front surface and the left side surface or between the front surface and a right side surface of the lower body frame 121, the open left side surface of the lower body frame 121 may be opened and closed. Further, the lower module 300 is arranged to be movable in a left-right direction in the lower body frame 121 to be accommodated inside the lower body frame 121 or to be taken out from inside the lower body frame 121 through the open left side surface of the lower body frame 121.

When a bundle of paper mediums 2 are deposited, the upper module 200 may separate and discriminate the bundle of paper mediums 2 deposited into individual sheets, classify the paper mediums 2 based on the discrimination results, and temporarily hold the paper mediums 2. In addition, the upper module 200 may convey some of the temporarily held paper mediums 2 to the customer or the lower module 300 to be stored therein. At least a portion of the upper module 200 may be accommodated inside the upper body 110. The upper module 200 may include a bundle storage unit 210, a paper medium alignment unit 220, a discrimination unit 230, a normal banknote temporary holding unit 240, a rejected banknote temporary holding unit 250, and a check printing unit 260, and an upper conveyance path 270.

When receiving a bundle of paper mediums 2, the bundle storage unit 210 may separate the bundle of paper mediums 2 into individual sheets and convey them. The bundle of paper mediums 2 may include at least one of bills and checks. The bundle storage unit 210 may include a bundle input unit 211 and a paper medium separation unit 212.

At least a portion of the bundle input unit 211 may be exposed and open to the outside of the upper body 110. Through the portion of the bundle input unit 211 that is exposed and open to the outside of the upper body 110, a customer may input a bundle of paper mediums 2 into the bundle input unit 211.

The paper medium separation unit 212 may separate the bundle of paper mediums 2 input in the bundle input unit 211 into individual sheets and convey them. Bills or checks included in the bundle of paper mediums 2 may be separated into individual sheets in the paper medium separation unit 212 and conveyed individually.

The paper medium alignment unit 220 can align and convey the paper mediums 2 that are conveyed individually from the bundle storage unit 210. The paper mediums 2 individually conveyed from the bundle storage unit 210 may be conveyed in an unaligned state. For example, the paper mediums 2 individually conveyed from the bundle storage unit 210 may be conveyed in a state in which they are arranged at an angle to the conveyance direction. The paper medium alignment unit 220 may align and convey the paper mediums 2 that are conveyed individually from the bundle storage unit 210 in an unaligned state. For example, the paper medium alignment unit 220 may align and convey the paper mediums 2 that are conveyed at an angle to the conveyance direction so that the paper mediums 2 are conveyed in a state in which they are arranged parallel to the conveyance direction.

The paper medium alignment unit 220 may include a traveling roller (not shown) capable of applying force to the paper mediums 2 in the conveyance direction and an inclining roller (not shown) capable of applying force to the paper mediums 2 in a direction inclined at a predetermined angle from the conveyance direction. In addition, the paper medium alignment unit 220 aligns the paper mediums 2 by allowing the paper mediums 2 that are conveyed at an angle to the conveyance direction to be aligned on an alignment surface parallel to the conveyance direction by the traveling roller and the inclining roller.

The discrimination unit 230 may discriminate the paper mediums 2 that are aligned and conveyed individually from the paper medium alignment unit 220. The discrimination unit 230 may determine whether the paper mediums 2 are normal banknotes or rejected banknotes. Additionally, the discrimination unit 230 may discriminate the types of paper mediums 2. The discrimination unit 230 may include a bill discrimination device 231 for discriminating bills and a check discrimination device 232 for discriminating checks.

For example, the bill discrimination device 231 may be a contact image sensor (CIS), and the check discrimination device 232 may be a magnetic resistance (MR). The CIS may include a light emitting element (not shown) and a light receiving element (not shown). In addition, in the CIS, the light emitting element irradiates light of a predetermined wavelength to the paper medium 2, which is a bill, and the light receiving element receives light reflected from the paper medium 2 or light transmitted through the paper medium 2, thereby obtaining an image of the paper medium 2. By comparing the image of the paper medium 2, which is a bill, sensed by the CIS with the stored original image of the bill, the paper medium 2, which is a bill, can be discriminated. The MR is configured to measure magnetic resistance, and can discriminate checks by recognizing magnetic ink characters printed on checks using magnetic resistance.

The bundle storage unit 210, the paper medium alignment unit 220, and the discrimination unit 230 described above may be sequentially arranged in a row along the horizontal direction. For example, the bundle storage unit 210, the paper medium alignment unit 220, and the discrimination unit 230 may be sequentially arranged in a line in an upper portion inside the upper body 110 of the device body 100. Accordingly, a bundle of paper mediums 2 input in the bundle storage unit 210 by a customer may be separated into individual sheets, aligned, and then discriminated while sequentially passing through the bundle storage unit 210, the paper medium alignment unit 220, and the discrimination unit 230.

The normal banknote temporary holding unit 240 may temporarily hold the individual normal banknotes, which are discriminated in the discrimination unit 230 and conveyed individually. The normal banknote temporary holding unit 240 is configured in a tape manner and may temporarily hold bills or checks, which are normal banknote, individually. The normal banknote temporary holding unit 240 configured in the tape manner may include a drum (not shown) on which a tape (not shown) can be wound and a reel (not shown) on which the tape to be wound on the drum is wound. In addition, the normal banknote temporary holding unit 240 configured in the tape manner allows the normal banknote to be sandwiched between the tapes wound around the drum as the tape unwinding from the reel is wound around the drum, so that the normal banknotes can be temporarily held individually. The normal banknotes temporarily held in the normal banknote temporary holding unit 240 configured in the tape manner may be conveyed individually from the normal banknote temporary holding unit 240 by allowing the tape holding the normal banknotes to be released from the drum.

The rejected banknote temporary holding unit 250 may temporarily hold the rejected banknotes individually that have been discriminated in the discrimination unit 230 and conveyed individually. With such configurations, there may be no need for a separate, relatively large space where rejected banknotes are collected and stacked. Accordingly, since the size of the upper module 200 can be further reduced, the size of the automated teller machine 1 can be further reduced. The rejected banknote temporary storage unit 250 is configured in a tape manner and may temporarily hold bills and checks, which are rejected banknote, individually. The rejected banknote temporary holding unit 250 configured in the tape manner may include a drum on which a tape can be wound and a reel on which the tape to be wound on the drum is wound. In addition, the normal banknote temporary holding unit 250 configured in the tape manner allows the rejected bill or check to be sandwiched between the tapes wound around the drum as the tape unwinding from the reel is wound around the drum, so that the rejected bill or check can be temporarily held as a single sheet. The rejected bill or check temporarily held in the rejected banknote temporary holding unit 250 configured in the tape manner may be conveyed as a single sheet from the rejected banknote temporary holding unit 250 by allowing the tape holding the rejected bills or checks to be released from the drum.

At least some of the rejected banknotes temporarily held as individual sheets in the rejected banknote temporary holding unit 250 may be conveyed individually from the rejected banknote temporary holding unit 250, and stacked in the bundle storage unit 210 after sequentially passing through the discrimination unit 230 and the paper medium alignment unit 220 individually. The rejected banknotes stacked in a bundle state in the bundle storage unit 210 may be returned to the customer. With such configurations, there may be no need for a separate conveyance path to convey the stacked rejected banknotes to the bundle storage unit 210 at once in a stacked state from a separate relatively large space where the rejected banknotes are collected and stacked. Accordingly, the conveyance path of the paper mediums 2 can be simplified and the processing time of the paper mediums 2 can be shortened.

Damaged banknotes among the rejected banknotes temporarily held as individual sheets in the rejected banknote temporary holding unit 250 may be conveyed individually from the rejected banknote temporary holding unit 250, stacked in the bundle storage unit 210 after sequentially passing through the discrimination unit 230 and the paper medium alignment unit 220 individually, and then returned to the customer. In addition, among the rejected banknotes temporarily held as individual sheets in the rejected banknote temporary holding unit 250, counterfeit banknotes may also be conveyed individually from the rejected banknote temporary holding unit 250, stacked in the bundle storage unit 210 after sequentially passing through the discrimination unit 230 and the paper medium alignment unit 220 individually, and then returned to the customer. The counterfeit banknotes among the rejected banknotes temporarily held individually in the rejected banknote temporary holding unit 250 may also be conveyed to the lower module 300 and stored in an additional storage box 322 to be described later included in the lower module 300.

The check printing unit 260 may print a seal on checks among normal banknotes conveyed as individual sheets from the normal banknote temporary holding unit 240. The bills or checks, which are normal banknotes temporarily held as individual sheets in the normal banknote temporary holding unit 240, may be individually conveyed to the lower module 300 from the normal banknote temporary holding unit 240, and stored in a cassette 330 or 340 to be described later included in the lower module 300. In this case, the checks, among the normal banknotes conveyed individually from the normal banknote temporary holding unit 240, on which the seal is printed in the check printing unit 260, may be conveyed to the lower module 300, and stored in the cassette 330 or 340 of the lower module 300.

The upper conveyance path 270 may allow the paper mediums 2 to be conveyed individually between the discrimination unit 230 and the normal banknote temporary holding unit 240 or between the discrimination unit 230 and the rejected banknote temporary holding unit 250. In addition, the upper conveyance path 270 may allow the paper mediums 2 to be conveyed individually from the normal banknote temporary holding unit 240 to the lower module 300 or from the rejected banknote temporary holding unit 250 to the lower module 300. The upper conveyance path 270 may include a first upper conveyance path 271, a second upper conveyance path 272, a third upper conveyance path 273, a fourth upper conveyance path 274, and a first upper switching gate 275, and a second upper switching gate 276.

The first upper conveyance path 271 may allow the paper mediums 2 to be conveyed individually between the discrimination unit 230 and the normal banknote temporary holding unit 240. In addition, the first upper conveyance path 271 may allow the paper mediums 2 to be conveyed individually between the discrimination unit 230 and the rejected banknote temporary holding unit 250. Further, the first upper conveyance path 271 may allow the paper mediums 2 to be conveyed individually from the normal banknote temporary holding unit 240 to the lower module 300. In addition, the first upper conveyance path 271 may allow the paper mediums 2 to be conveyed individually from the rejected banknote temporary holding unit 250 to the lower module 300. The first upper conveyance path 271 may be connected to the discrimination unit 230 and the normal banknote temporary holding unit 240. Further, the first upper conveyance path 271 may be connected to the second upper conveyance path 272 through the first upper switching gate 275. Furthermore, the first upper conveyance path 271 may be connected to the third upper conveyance path 273 through the second upper switching gate 276.

The second upper conveyance path 272 may allow the paper mediums 2 to be conveyed individually between the first upper conveyance path 271 and the rejected banknote temporary holding unit 250. The second upper conveyance path 272 may be connected to the first upper conveyance path 271 and the rejected banknote temporary holding unit 250. The second upper conveyance path 272 may be connected to the first upper conveyance path 271 through the first upper switching gate 275.

The third upper conveyance path 273 may allow the paper mediums 2 to be conveyed individually from the first upper conveyance path 271 to the check printing unit 260. The third upper conveyance path 272 may be connected to the first upper conveyance path 271 through the second upper switching gate 276.

The fourth upper conveyance path 274 may allow the paper mediums 2 to be conveyed individually from the check printing unit 260 to the lower module 300. The fourth upper conveyance path 274 may be connected to the check printing unit 260 and the lower module 300. The fourth upper conveyance path 274 may be connected to a lower conveyance path 321 to be described later included in the lower module 300.

The first upper switching gate 275 may connect the first upper conveyance path 271 to the normal banknote temporary holding unit 240 or connect the first upper conveyance path 271 to the second upper conveyance path 272. When the first upper switching gate 275 connects the first upper conveyance path 271 to the normal banknote temporary holding unit 240, the normal banknotes discriminated in the discrimination unit 230 may be conveyed individually to the normal banknote temporary holding unit 240 through the first upper conveyance path 271. In addition, the normal banknotes temporarily held in the normal banknote temporary holding unit 240 may be conveyed individually to the discrimination unit 230 through the first upper conveyance path 271. When the first upper switching gate 275 connects the first upper conveyance path 271 to the second upper conveyance path 272, the rejected banknotes discriminated in the discrimination unit 230 may be conveyed individually to the rejected banknote temporary holding unit 250 through the first upper conveyance path 271 and the second upper conveyance path 272. Further, the rejected banknotes temporarily held in the rejected banknote temporary holding unit 250 may be conveyed individually to the discrimination unit 230 through the second upper conveyance path 272 and the first upper conveyance path 271.

The second upper switching gate 276 may or may not connect the first upper conveyance path 271 to the check printing unit 260. When the second upper switching gate 276 connects the first upper conveyance path 271 to the check printing unit 260, the normal banknotes conveyed individually from the normal banknote temporary holding unit 240 through the first upper conveyance path 271 may be conveyed to the check printing unit 260. When the second upper switching gate 276 does not connect the first upper conveyance path 271 to the check printing unit 260, the paper mediums 2 may be conveyed individually between the discrimination unit 230 and the first upper conveyance path 271.

The normal banknote temporary holding unit 240, the rejected banknote temporary holding unit 250, and the check printing unit 260 described above may be disposed lower than the bundle storage unit 210, the paper medium alignment unit 220, and the discrimination unit 230. Further, the normal banknote temporary holding unit 240, the rejected banknote temporary holding unit 250, and the check printing unit 260 may be arranged in a row along the horizontal direction. For example, the normal banknote temporary holding unit 240, the rejected banknote temporary holding unit 250, and the check print unit 260 may be arranged in a row along the horizontal direction, lower than the bundle storage unit 210, the paper medium alignment unit 220, and the discrimination unit 230, inside the upper body 110 of the device body 100. With such configurations, the size of the upper module 200 can be further reduced, and thus the size of the financial automation device 1 can be further reduced. For example, with the above-described configurations, the height of the upper module 200 can be further lowered, and thus the overall height of the financial automation device 1 can be further lowered.

At least some of the paper mediums 2 sorted in the upper module 200 may be conveyed and stored in the lower module 300. In the lower module 300, the normal banknotes temporarily held in the normal banknote temporary holding unit 240 of the upper module 200 may be conveyed individually from the normal banknote temporary holding unit 240 and stored. In addition, in the lower module 300, counterfeit banknotes among the rejected banknotes temporarily held in the rejected banknote temporary holding unit 250 of the upper module 200 may be conveyed individually from the rejected banknote temporary holding unit 250 and stored. Further, in the lower module 300, uncollected banknotes stacked in the bundle storage unit 210 of the upper module 200 may be conveyed individually from the bundle storage unit 210 and stored. The lower module 300 may be detachably accommodated inside the lower body 120 of the device body 100. The lower module 300 may be accommodated inside the lower body 120 of the device body 100, and connected to the upper module 200 at least partially accommodated inside the upper body 110 of the device body 100. The lower module 300 may include a cassette accommodation frame 310, a lower conveyance module 320, and cassettes 330 and 340.

The cassettes 330 and 340 may be detachably accommodated in the cassette accommodation frame 310. The cassette accommodation frame 310 may be detachably accommodated inside the lower body 120 of the device body 100 with the cassettes 330 and 340 accommodated therein. The cassette accommodation frame 310 may be accommodated inside the lower body frame 121 through the open surface of the lower body frame 121 of the lower body 120. For example, in a state in which the open left surface of the lower body frame 121 of the lower body 120 is opened through the rotation of the lower body opening/closing door 122, the cassette accommodation frame 310 may be moved in the left-right direction in the lower body frame 121 to be accommodated inside the lower body frame 121 or taken out from the inside of the lower body frame 121. When the cassette accommodation frame 310 is accommodated inside the lower body frame 121 through the open left surface of the lower body frame 121 of the lower body 120, the open left side of the lower body frame 121 may be closed by the lower body opening door 122.

One surface of the cassette accommodation frame 310 is open, and the cassettes 330 and 340 may be detachably accommodated inside the cassette accommodation frame 310 through the open surface of the cassette accommodation frame 310. The open surface of the cassette accommodation frame 310 may be opened and closed by the lower conveyance module 320. The upper surface of the cassette accommodation frame 310 may be open. In a state in which the open upper surface of the cassette accommodation frame 310 is opened by the lower conveyance module 320, the cassettes 330 and 340 may be detachably accommodated inside the cassette accommodation frame 310 in the up-down direction. In this case, as will be described later, the lower conveyance module 320 is rotatably connected to the cassette accommodation frame 310 and is rotated to open and close the open upper surface of the cassette accommodation frame 310.

The lower conveyance module 320 may open and close the open surface of the cassette accommodation frame 310. The upper surface of the cassette accommodation frame 310 is open, and the lower conveyance module 320 may open and close the open upper surface of the cassette accommodation frame 310. The lower conveyance module 320 is rotatably connected to the cassette accommodation frame 310 and may open and close the open upper surface of the cassette accommodation frame 310. In this case, the lower conveyance module 320 may be configured to be rotatable about a rotation axis extending horizontally between the upper and rear surfaces of the cassette accommodation frame 310. In addition, the lower conveyance module 320 may rotate in the up-down direction to open and close the open upper surface of the cassette accommodation frame 310. In the lower conveyance module 320, at least a portion of the lower conveyance path 321 connected to the upper conveyance path 270 of the upper module 200 is disposed to receive the paper medium 2 from the upper module 200, and the lower conveyance module 320 may include an additional storage box 322.

The lower conveyance path 321 may allow the paper mediums 2 conveyed individually from the upper module 200 to be conveyed individually to the cassettes 330 and 340 or the additional storage box 322. The lower conveyance path 321 may allow the normal banknotes conveyed individually from the upper module 200 to be conveyed individually the cassettes 330 and 340. In addition, the lower conveyance path 321 may allow counterfeit banknotes or uncollected banknotes conveyed individually from the upper module 200 to be conveyed individually to the additional storage box 322. The lower conveyance path 321 may include a first lower conveyance path 321-1, a second lower conveyance path 321-2, a third lower conveyance path 321-3, and a fourth lower conveyance path 321-4, a first lower switching gate 321-5, and a second lower switching gate 321-6.

The first lower conveyance path 321-1 may be connected to the upper conveyance path 270 of the upper module 200. The first lower conveyance path 321-1 may be connected to the fourth upper conveyance path 274 of the upper conveyance path 270. Accordingly, the paper mediums 2 can be conveyed individually from the upper module 200 to the lower module 300 through the fourth upper conveyance path 274 and the first lower conveyance path 321-1.

The second lower conveyance path 321-2 may allow the paper mediums 2 conveyed individually from the upper module 200 through the first lower conveyance path 321-1 to be conveyed to a first cassette 330 to be described later included in the cassettes 330 and 340. The second lower conveyance path 321-2 may be connected to the first lower conveyance path 321-1 and the first cassette 330. The second lower conveyance path 321-2 may be connected to the first lower conveyance path 321-1 through the first lower switching gate 321-5.

The third lower conveyance path 321-3 may allow the paper mediums 2 conveyed individually through the first lower conveyance path 321-1 to be conveyed to a second cassette 340 to be described later included in the cassettes 330 and 340. Further, the third lower conveyance path 321-3 may allow the paper mediums 2 conveyed individually through the first lower conveyance path 321-1 to be conveyed to the additional storage box 322. The third lower conveyance path 321-3 may be connected to the first lower conveyance path 321-1 and the second cassette 340. The third lower conveyance path 321-3 may be connected to the first lower conveyance path 321-1 through the first lower switching gate 321-5.

The fourth lower conveyance path 321-4 may allow the paper mediums 2 conveyed individually through the first lower conveyance path 321-1 and the third lower conveyance path 321-3 to be conveyed to the additional storage box 322. The fourth lower conveyance path 321-4 may be connected to the third lower conveyance path 321-3 through the second lower switching gate 321-6.

The first lower switching gate 321-5 may connect the first lower conveyance path 321-1 to the second lower conveyance path 321-2 or the third lower conveyance path 321-3. When the first lower switching gate 321-5 connects the first lower conveyance path 321-1 to the second lower conveyance path 321-2, the normal banknotes conveyed individually from the upper module 200 may be conveyed individually to the first cassette 330 through the lower conveyance path 321-1 and the second lower conveyance path 321-2. When the first lower switching gate 321-5 connects the first lower conveyance path 321-1 to the third lower conveyance path 321-3, normal banknote, counterfeit banknotes, or recovery notes conveyed individually from the upper module 200 may be conveyed individually through the first lower conveyance path 321-1 and the third lower conveyance path 321-3.

The second lower switching gate 321-6 may connect the third lower conveyance path 321-3 to the second cassette 340 or the fourth lower conveyance path 321-4. When the second lower switching gate 321-6 connects the third upper conveyance path 321-3 to the second cassette 340, the normal banknotes conveyed individually through the first lower conveyance path 321-1 and the third lower conveyance path 321-3 may be conveyed to the second cassette 340. When the second lower switching gate 321-6 connects the third lower conveyance path 321-3 to the fourth lower conveyance path 321-4, counterfeit banknotes or uncollected banknotes conveyed individually through the first lower conveyance path 321-1 and the third lower conveyance path 321-3 may be conveyed to the additional storage box 322.

The second lower conveyance path 321-2, the third lower conveyance path 321-3, the fourth lower conveyance path 321-4, the first lower switching gate 321-5, and the second lower switching gate 321-5 described above may be disposed in the lower conveyance module 320. In addition, the first lower conveyance path 321-1 may be disposed in the lower body 120 of the device body 100 to be connected to the fourth upper conveyance path 274 of the upper conveyance path 270 and the second lower conveyance path 321-2.

The additional storage box 322 may store the paper mediums 2. The additional storage box 322 may store counterfeit banknotes sorted in the upper module 200. Among the rejected banknotes temporarily reserved in the rejected banknote temporary holding unit 250 of the upper module 200, counterfeit banknotes may be conveyed individually to the additional storage box 322 and stored therein through at least a portion of the upper conveyance path 270 of the upper module 200 and at least a portion of the lower conveyance path 321. Uncollected notes sorted in the upper module 200 may also be stored in the additional storage box 322. When a customer cancels a deposit, at least some of the normal banknotes temporarily held in the normal banknote temporary holding unit 240 of the upper module 200 and the rejected banknotes temporarily held in the rejected banknote temporary holding unit 250 may be conveyed individually and stacked in the bundle storage unit 210 to be returned to the customer. The customer may not collect the normal banknotes and rejected banknotes stacked in the bundle storage unit 210. The uncollected banknotes may be conveyed individually from the bundle storage unit 210 through at least a portion of the upper conveyance path 270 of the upper module 200 and at least a portion of the lower conveyance path 321 to be stored in the additional storage box 322.

At least some of the paper mediums 2 sorted in the upper module 200 may be stored in the cassettes 330 and 340. The normal banknotes sorted in the upper module 200 may be stored in the cassettes 330 and 340. The cassettes 330 and 340 are connected to the lower conveyance path 321 and the paper mediums 2, that is, the normal banknotes may be stored therein. In the cassettes 330 and 340, the normal banknotes temporarily stored individually in the normal banknote temporary holding unit 240 of the upper module 200 may be conveyed individually from the normal banknote temporary holding unit 240 and stored. The cassettes 330 and 340 may store one or more of bills and checks that are normal banknotes. The cassettes 330 and 340 may include a plurality of storage spaces 330-1, 330-2, 340-1, and 340-2. Accordingly, bills as normal banknotes may be stored in one of the plurality of storage spaces 330-1, 330-2, 340-1, and 340-2 of the cassettes 330 and 340, and checks as normal banknotes may be stored in the other. Alternatively, bills as normal banknotes may be stored by type in each of the plurality of storage spaces 330-1, 330-2, 340-1, and 340-2 of the cassettes 330 and 340, or checks as normal banknotes may be stored by type in each of the plurality of storage spaces 330-1, 330-2, 340-1, and 340-2 of the cassettes 330 and 340. The plurality of storage spaces 330-1, 330-2, 340-1, and 340-2 may be arranged in the up-down direction and configured to be partitioned from each other. The cassettes 330 and 340 may include cassette bodies 331 and 341, and cassette opening/closing doors 332 and 342, respectively.

The normal banknotes may be stored inside the cassette bodies 331 and 341. The cassette opening/closing doors 332 and 342 may open and close the open surface of each of the cassette bodies 331 and 341. Each of the cassette bodies 331 and 341 may have an open peripheral surface between the upper and lower surfaces, and the cassette opening/closing doors 332 and 342 may respectively open the open peripheral surfaces of the cassette bodies 331 and 341. For example, one of the front, rear, left and right side surfaces of each of the cassette bodies 331 and 341 may be open, and each of the cassette opening/closing doors 332 and 342 may open and close one of the front, rear and left side surfaces of each of the cassette bodies 331 and 341. Each of the cassette opening/closing doors 332 and 342 may be configured to be rotatable about a rotation axis extending in the up-down direction and may open and close one open surface of each of the cassette main body 331 and 341. For example, the front surfaces of the cassette bodies 331 and 341 may be open. In addition, each of the cassette opening/closing doors 332 and 342 may be configured to be rotatable about the rotation axis extending in the up-down direction between the front and left side surfaces or between the front and right side surfaces of each of the cassette bodies 331 and 341 to open and close the open front surface of each of the cassette bodies 331 and 341.

The cassettes 330 and 340 may be detachably accommodated inside the cassette accommodation frame 310 through one open surface of the cassette accommodation frame 310. In a state in which the cassette opening/closing doors 332 and 342 open the open surfaces of the cassette bodies 331 and 341, the normal banknotes stored in the cassette 330 and 340 may be taken out by the customer. In addition, in a state in which the cassette opening/closing doors 332 and 342 closes the open surfaces of the cassette bodies 331 and 341, the cassettes 330 and 340 may be detachably accommodated inside the cassette accommodation frame 310 through the open surface of the cassette accommodation frame 310.

The direction in which the cassettes 330 and 340 are detachably accommodated inside the cassette accommodation frame 310 and the direction in which the cassette opening/closing doors 332 and 342 open and close the open surfaces of the cassette bodies 331 and 341 may be different. With such configurations, when the cassette opening/closing doors 332 and 342 are moved to open the open surfaces of the cassette bodies 331 and 341, the cassettes 330 and 340 accommodated inside the cassette accommodation frame 310 may be prevented from being separated from the cassette accommodation frame 310. Thus, in a state in which the cassettes 330 and 340 are separated from the cassette accommodation frame 310, it is possible to minimize the cassette accommodation frame 310 being accommodated inside the lower body 120 of the device body 100. In addition, it is possible minimize the cases where the cassettes 330 and 340 becomes inoperable.

The cassettes 330 and 340 may be detachably accommodated in the cassette accommodation frame 310 in the up-down direction through the open upper surface of the cassette accommodation frame 310. In addition, the open surface of the cassette body 331 and 341 may be opened and closed by the cassette opening/closing doors 332 and 342 through the rotation of the cassette opening/closing doors 332 and 342 in the horizontal direction. The cassettes 330 and 340 may include a first cassette 330 and a second cassette 340.

The first cassette 330 may be connected to the second lower conveyance path 321-2, so that paper mediums 2, i.e., the normal banknotes, conveyed individually through the second lower conveyance path 321-2 may be stored in the first cassette 330. The first cassette 330 may include a first cassette upper storage space 330-1 and a first cassette lower storage space 330-2. The first cassette upper storage space 330-1 and the first cassette lower storage space 330-2 may be arranged in the up-down direction in the first cassette 330 and configured to be partitioned from each other. In the first cassette upper storage space 330-1 and the first cassette lower storage space 330-2, bills as normal banknotes may be stored, checks as normal banknotes may be stored, bills as normal banknotes may be stored by type, or checks as normal banknotes may be stored by type.

The second cassette 340 may be connected to the third lower conveyance path 321-3, and the paper mediums 2, i.e., the normal banknotes, conveyed individually through the third lower conveyance path 321-3 may be stored in the second cassette 340. The second cassette 340 may include a second cassette upper storage space 340-1 and a second cassette lower storage space 340-2. The second cassette upper storage space 340-1 and the second cassette lower storage space 340-2 may be arranged in the up-down direction in the second cassette 340 and configured to be partitioned from each other. In the second cassette upper storage space 340-1 and the second cassette upper storage space 340-2, bills as normal banknotes may be stored, checks as normal banknotes may be stored, bills as normal banknotes may be stored by type, or checks as normal banknotes may be stored by type.

Hereinafter, with reference to FIGS. 3 to 9, the operation and effects of the financial automation device 1 having the above-described configurations will be described.

Figure 3:
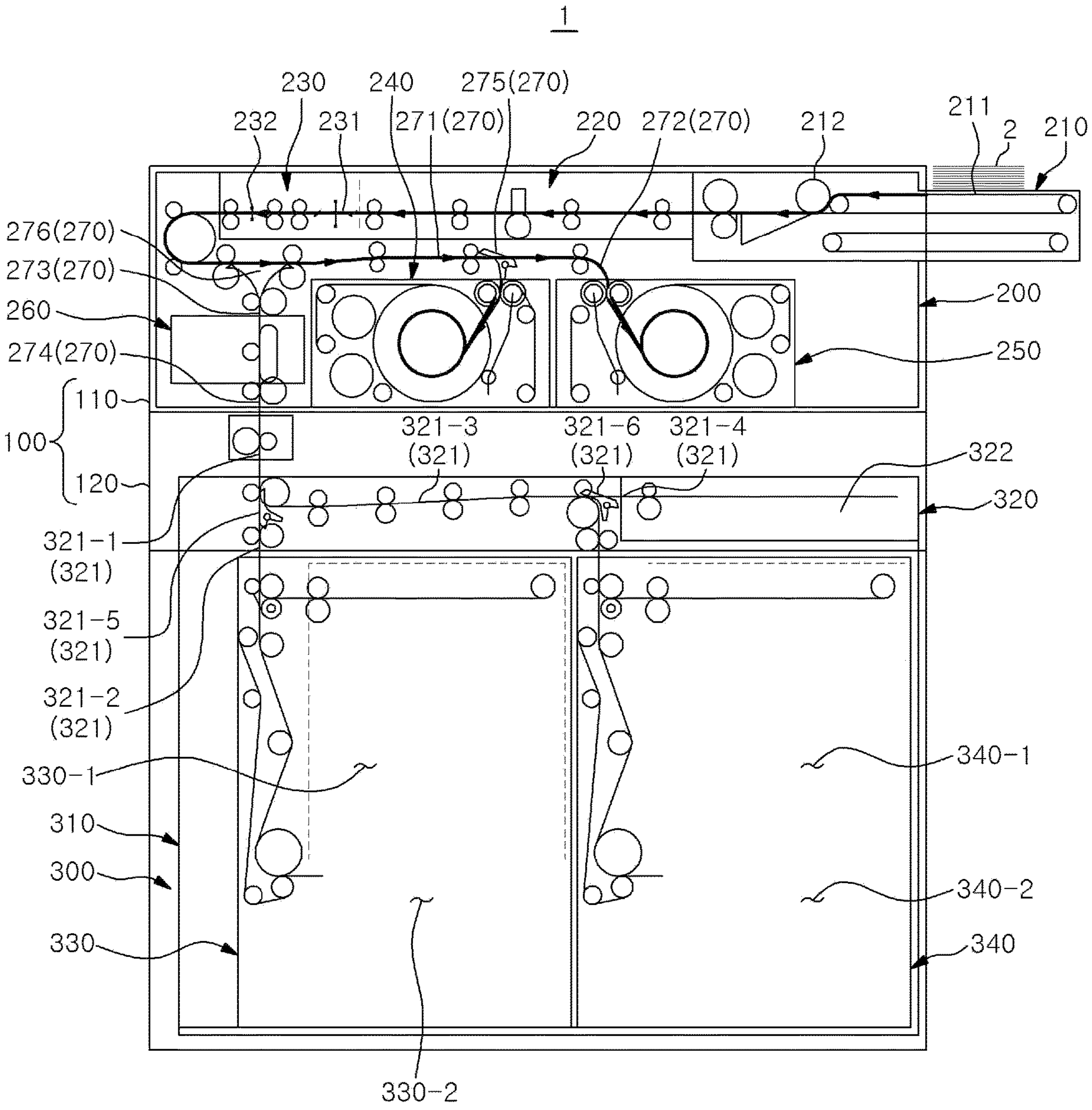
FIG. 3 is a diagram showing a deposit of the automated teller machine according to one embodiment of the present disclosure.

Referring to FIG. 3, when a customer inserts a bundle of paper mediums 2 into the bundle input unit 211 of the bundle storage unit 210, the paper medium separation unit 212 of the bundle storage unit 210 separates the bundle of paper mediums 2 individually so that the paper mediums are conveyed individually.

The paper mediums 2 conveyed individually from the paper medium separation unit 212 of the bundle storage unit 210 may be aligned in the paper medium alignment unit 220 and then discriminated in the discrimination unit 230. Since the paper mediums 2 are discriminated in the discrimination unit 230 after being aligned in the paper medium alignment unit 220, the discrimination of the paper mediums 2 in the discrimination unit 230 can be performed more accurately.

The normal banknotes discriminated in the discrimination unit 230 may be conveyed individually through the first upper conveyance path 271 of the upper conveyance path 270 and temporarily held individually in the normal banknote temporary holding unit 240. In addition, the rejected banknotes discriminated in the discrimination unit 230 may be conveyed individually through the first upper conveyance path 271 and the second upper conveyance path 272 of the upper conveyance path 270 and temporarily held individually in the rejected banknote temporary holding unit 250.

Figure 4:
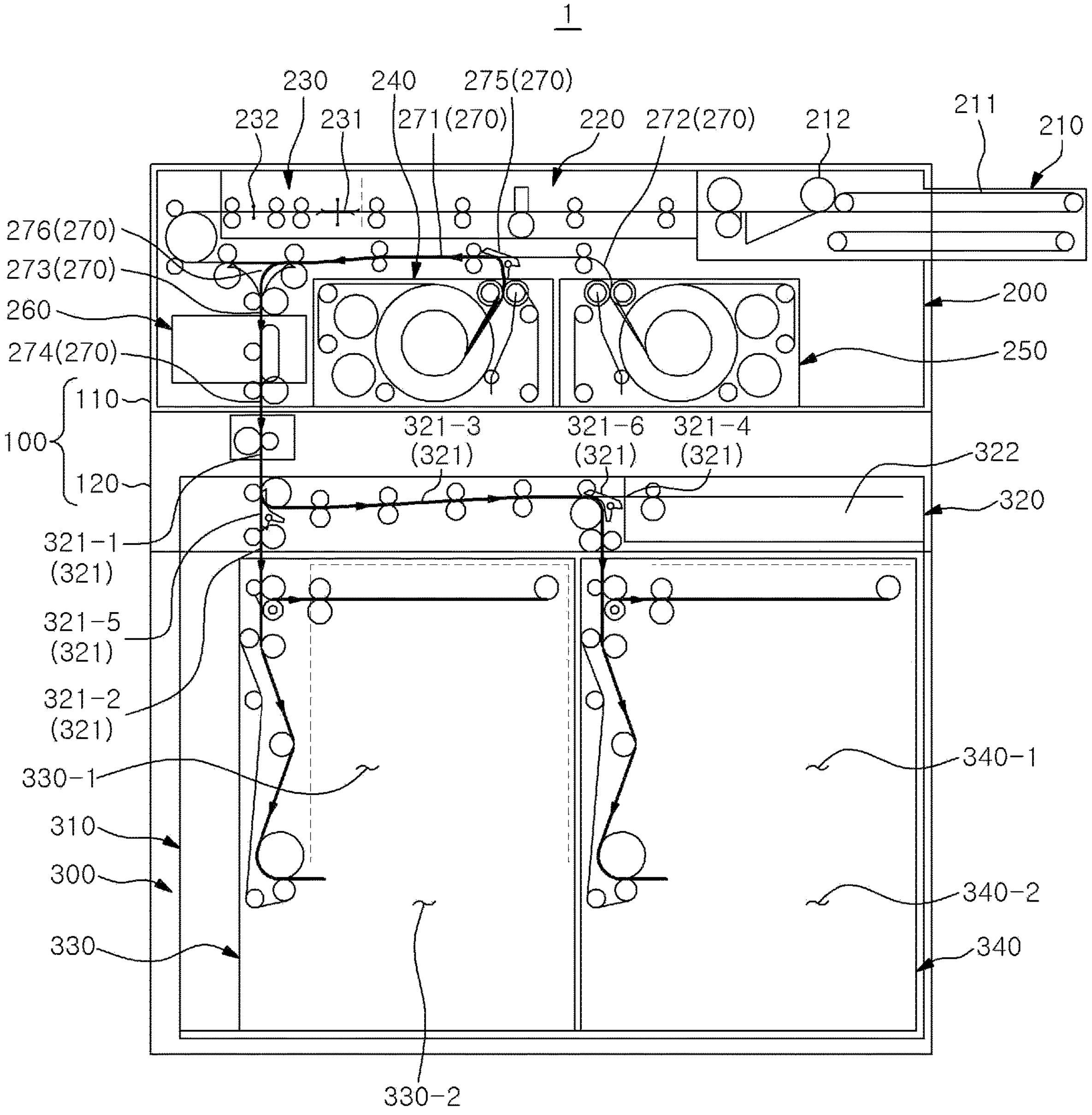
FIG. 4 is a diagram showing a deposit reception in the automated teller machine according to one embodiment of the present disclosure.

Referring to FIG. 4, when a customer selects a deposit reception, the normal banknotes temporarily held individually in the normal banknote temporary holding unit 240 may be conveyed individually to the lower module 300 through the first upper conveyance path 271, the third upper conveyance path 273, and the fourth upper conveyance passage 274 of the upper conveyance path 270. The normal banknotes conveyed individually to the lower module 300 may be conveyed individually through the first lower conveyance path 321-1 to the third lower conveyance path 321-3 of the lower conveyance path 321 to be stored in the cassettes 330 and 340.

Figure 7:
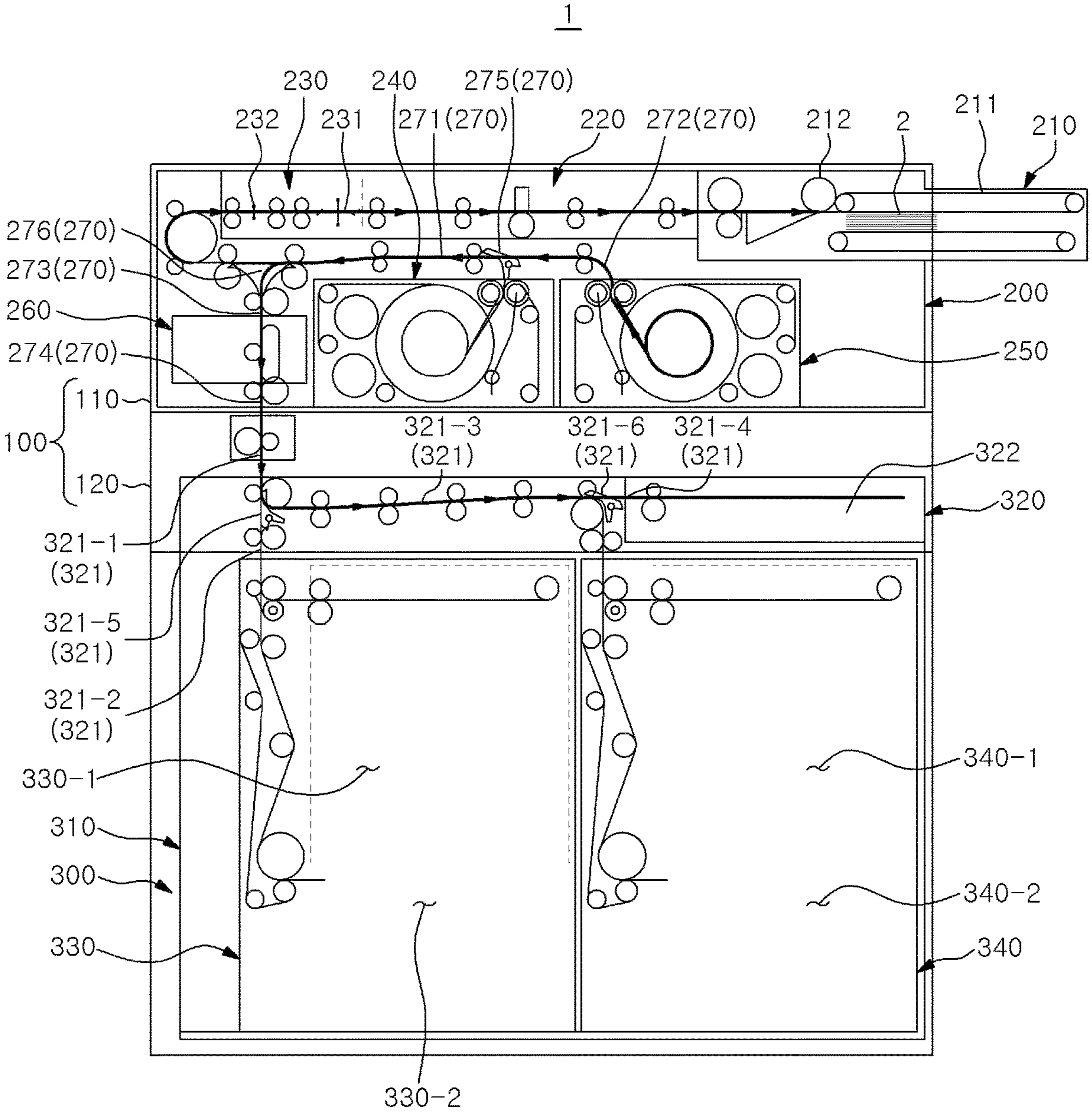
FIG. 7 is a diagram showing the processing of rejected banknotes of the automated teller machine according to one embodiment of the present disclosure.

In this case, referring to FIG. 7, among the rejected banknotes temporarily held individually in the rejected banknote temporary holding unit 250, the damaged banknote may be conveyed through the second upper conveyance path 272 and the first upper conveyance path 271 of the upper conveyance path 270, the discrimination unit 230, and the paper medium alignment unit 220 to be stacked in the bundle storage unit 210. The damaged banknotes stacked in the bundle storage unit 210 may be collected by the customer.

Figure 5:
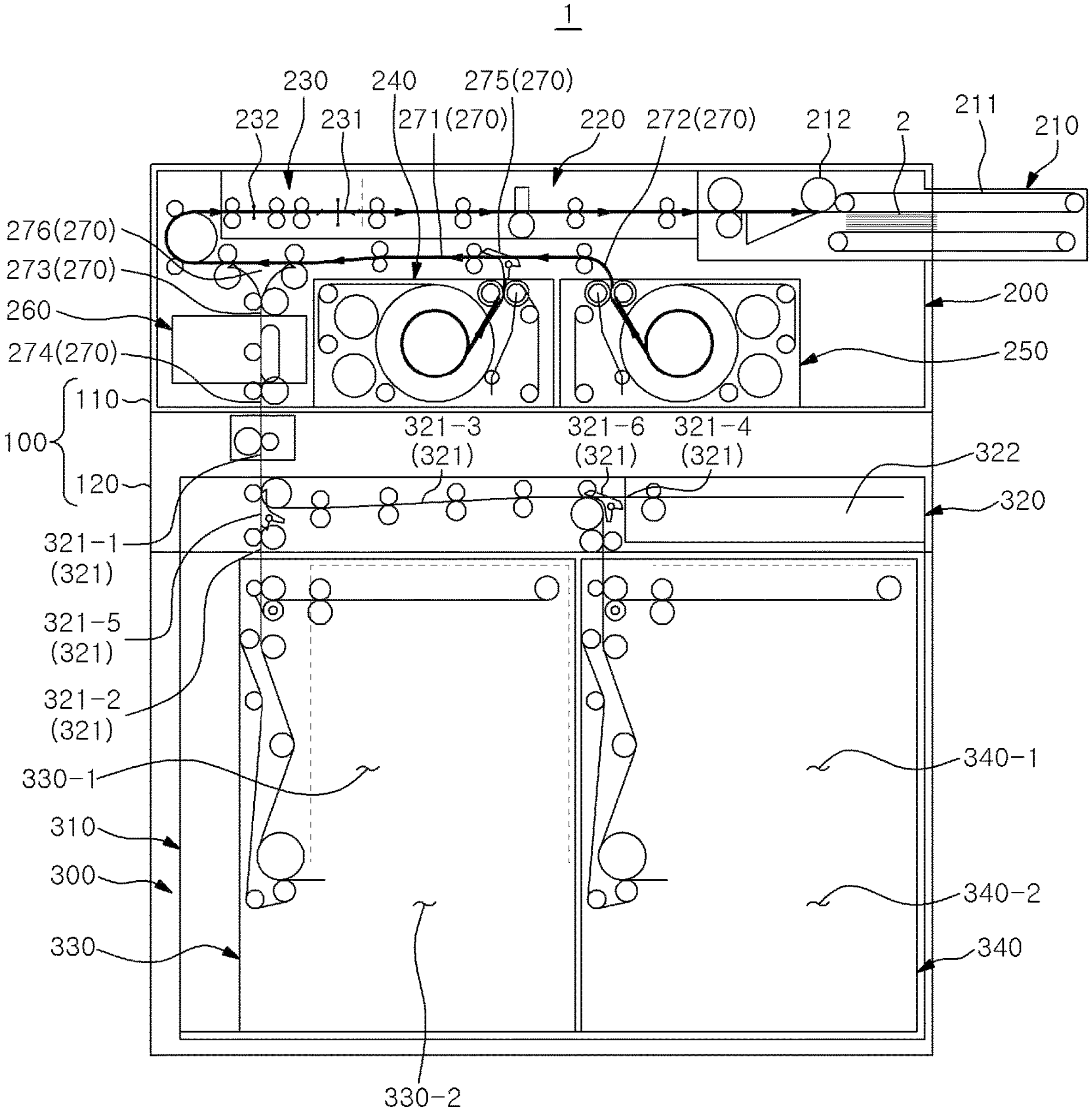
FIG. 5 is a diagram showing a deposit cancellation of the automated teller machine according to one embodiment of the present disclosure.

Referring to FIG. 5, when the customer selects to cancel the deposit, the normal banknotes temporarily held individually in the normal banknote temporary holding unit 240 may be conveyed individually through the first upper conveyance path 271 of the upper conveyance path 270, the discrimination unit 230, and the paper medium alignment unit 220 to be stacked in the bundle storage unit 210. In addition, the rejected banknotes temporarily held individually in the rejected banknote temporary holding unit 250 may be conveyed through the second upper conveyance path 272 and the first upper conveyance path 271 of the upper conveyance path 270, the discrimination unit 230, and the paper medium alignment unit 220 to be stacked in the bundle storage unit 210. The normal banknotes and the rejected banknotes stacked in the bundle storage unit 210 can be collected by the customer.

Figure 6:
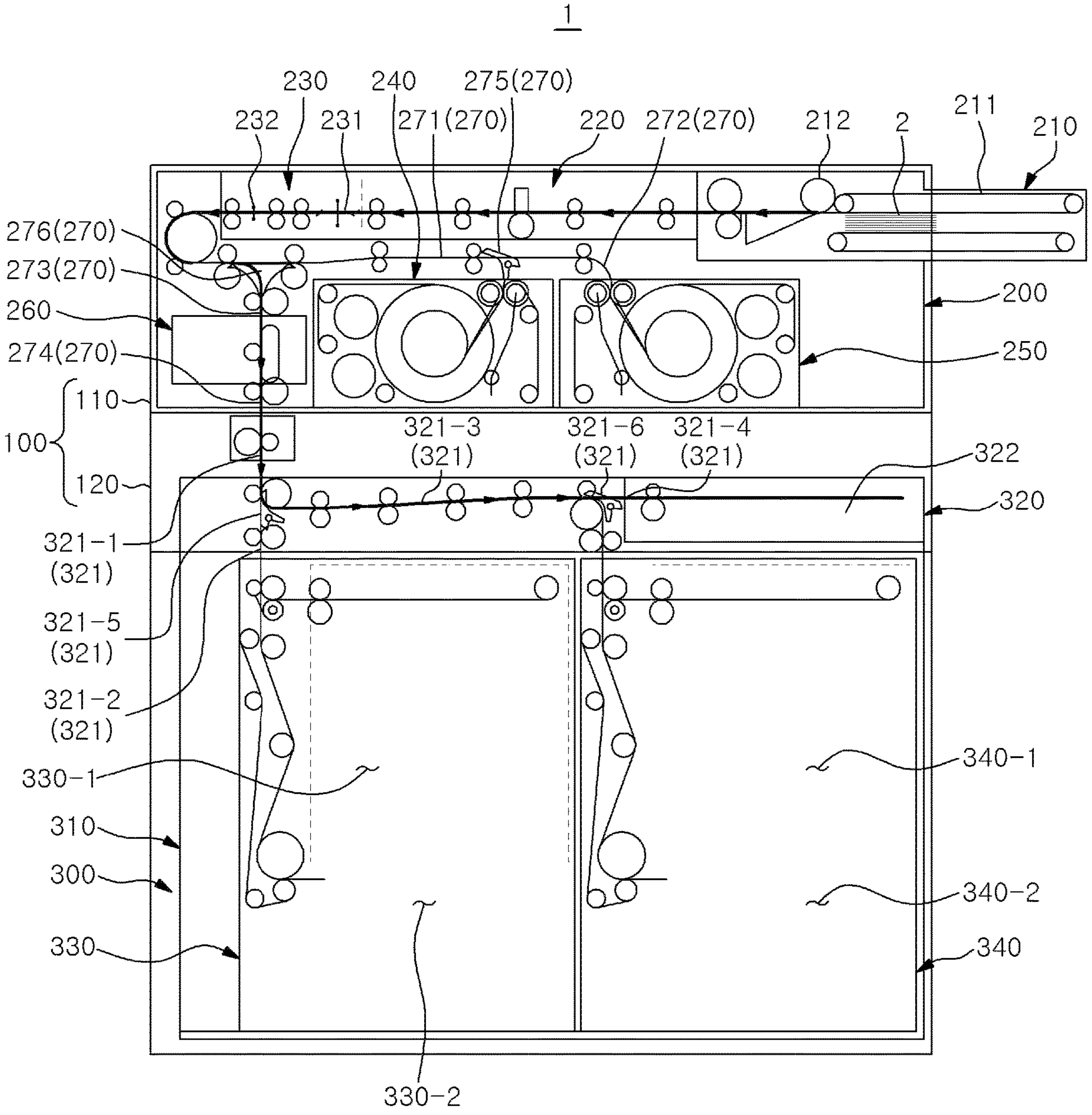
FIG. 6 is a diagram showing the processing of uncollected banknotes in the automated teller machine according to one embodiment of the present disclosure.

In this case, referring to FIG. 6, among the normal banknotes and the rejected banknotes stacked in the bundle storage unit 210, uncollected banknotes that have not been collected by the customer may be conveyed individually to the lower module 300 through the paper medium alignment unit 220, the discrimination unit 230, the third upper conveyance path 273 and the fourth upper conveyance path 274 of the upper conveyance path 270. The uncollected banknotes conveyed individually to the lower module 300 may be conveyed individually through the first lower conveyance path 273-1, the third lower conveyance path 273-3, and the fourth lower conveyance path 273-4 of the lower conveyance path 273 to be stored in the additional storage box 322 of the lower module 300.

Meanwhile, referring to FIG. 7, when the deposit reception is completed or cancelled, counterfeit banknotes among the rejected banknotes temporarily held individually in the rejected banknote temporary holding unit 250 may be conveyed individually to the lower module 300 through the second upper conveyance path 272, the first upper conveyance path 271, the third upper conveyance path 273, and the fourth upper conveyance path 274 of the upper conveyance path 270. The counterfeit banknotes conveyed individually to the lower module 300 may be conveyed individually through the first lower conveyance path 273-1, the third lower conveyance path 273-3, and the fourth lower conveyance path 273-4 of the lower conveyance path 273 to be stored in the additional storage box 322 of the lower module 300.

With such configurations, there is no need for a separate, relatively large space where the rejected banknotes are collected and stacked, and for a separate conveyance path for conveying the stacked rejected banknotes at once, so that the size of the upper module 200 and hence the financial automation device 1 can be further reduced, the conveyance path of the paper mediums 2 can be simplified, and the processing time of the paper mediums 2 can be shortened.

Figure 8:
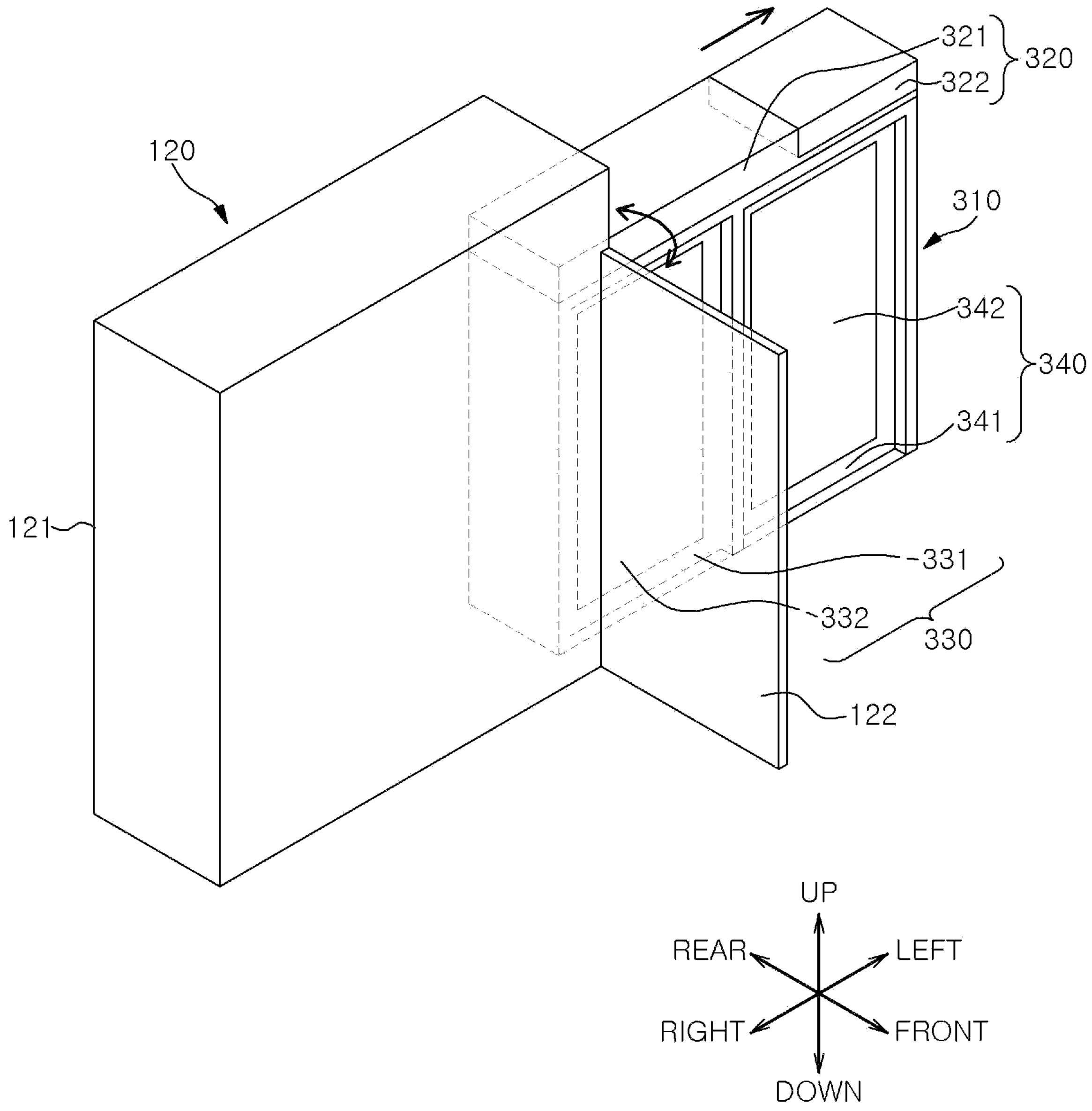
FIG. 8 is a diagram showing a state in which a lower module of the automated teller machine according to one embodiment of the present disclosure is separated from the lower body.
Figure 9:
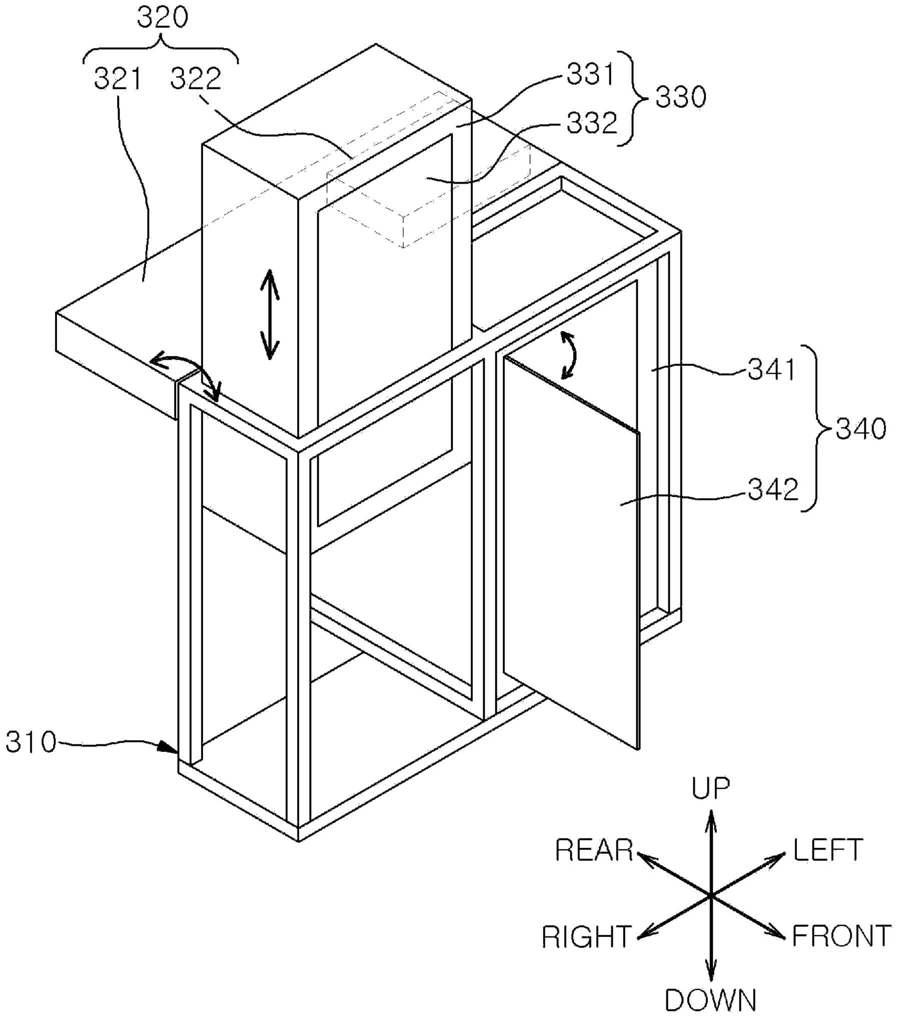
FIG. 9 is a diagram showing the drawing out of a cassette from a cassette accommodation frame of the lower module of the automated teller machine according to one embodiment of the present disclosure, and the opening of an open surface of the cassette by a cassette opening door while the cassette is accommodated in the cassette accommodation frame.

Referring to FIGS. 8 and 9, when the normal banknotes are sufficiently stored in the cassettes 330 and 340 of the lower module 300, the customer can open the open surface of the lower body frame 121 by using the lower body opening/closing door 122. In this state, the customer can take out the lower module 300 from the lower body frame 121. In the state where the lower module 300 is taken out from the lower body frame 121, the customer can open the open surfaces of the cassette bodies 331 and 341 of the cassettes 330 and 340 accommodated inside the cassette accommodation frame 310 by the cassette opening/closing doors 332 and 342. In addition, in the state where the open surfaces of the cassette bodies 331 and 341 are opened by the cassette opening/closing doors 332 and 342, the customer can take out the normal banknotes stored in the cassette bodies 331 and 341.

Referring to FIG. 9, in the state where with the lower conveyance module 320 opens the open surface of the cassette accommodation frame 310, the cassettes 330 and 340 may be detachably accommodated inside the cassette accommodation frame 310. The direction in which the cassettes 330 and 340 are detachably accommodated inside the cassette accommodation frame 310 and the direction in which the cassette opening/closing doors 332 and 342 open and close the open side of the cassette body 331 and 341 may be different. For example, in a state where the upper surface of the cassette accommodation frame 310 is open and the lower conveyance module 320 opens the open upper surface of the cassette accommodation frame 310, the cassettes 330 and 340 may be detachably accommodated inside the cassette accommodation frame 310 in the up-down direction. In addition, the front surfaces of the cassette bodies 331 and 341 may be open, and the cassette opening/closing doors 332 and 342 may rotate in the horizontal direction to open and close the open front surfaces of the cassette bodies 331 and 341. With such configurations, when the cassette opening/closing doors 332 and 342 are moved to open the open surfaces of the cassette bodies 331 and 341, the cassettes 330 and 340 accommodated inside the cassette accommodation frame 310 can be prevented from being separated from the cassette accommodation frame 310. Accordingly, it is possible to minimize the cassette accommodation frame 310 being accommodated inside the lower body 120 of the device body 100 in the state where the cassettes 330 and 340 are separated from the cassette accommodation frame 310. In addition, the cases where the cassettes 330 and 340 do not operate can be minimized.

What is claimed is:

1. An automated teller machine comprising:

a bundle storage unit into which a bundle of paper mediums are input and which separates the bundle of paper mediums into individual sheets and conveys the paper mediums individually;

a paper medium alignment unit that aligns and conveys the paper mediums conveyed individually from the bundle storage unit;

a discrimination unit that discriminates the aligned paper mediums conveyed individually from the paper medium alignment unit;

a normal banknote temporary holding unit that temporarily holds normal banknotes discriminated in the discrimination unit and conveyed individually; and a rejected banknote temporary holding unit that temporarily holds rejected banknotes discriminated in the discrimination unit and conveyed individually.

2. The automated teller machine of claim 1, wherein at least some of the rejected banknote temporarily stored as individual sheets in the rejected banknote temporary holding unit are conveyed individually from the rejected banknote temporary holding unit, and stacked in the bundle storage unit after individually passing through the discrimination unit and the paper medium alignment unit sequentially.

3. The automated teller machine of claim 1, wherein the bundle storage unit, the paper medium alignment unit, and the discrimination unit are sequentially arranged in a row along a horizontal direction.

4. The automated teller machine of claim 1, wherein the normal banknote temporary storage unit and the rejected banknote temporary storage unit are disposed lower than the bundle storage unit, the paper medium alignment unit, and the discrimination unit.

5. The automated teller machine of claim 4, further comprising:

a check printing unit that prints a seal on checks among the normal banknotes conveyed individually from the normal banknote temporary holding unit, wherein the check printing unit, the normal banknote temporary holding unit, and the rejected banknote temporary holding unit are arranged in a row along a horizontal direction.

6. The automated teller machine of claim 1, wherein the normal banknote temporary holding unit is configured in a tape manner to temporarily hold the normal banknotes individually.

7. The automated teller machine of claim 1, wherein the rejected banknote temporary holding unit is configured in a tape manner to temporarily hold the rejected banknote individually.

8. The automated teller machine of claim 1, wherein the discrimination unit includes a bill discrimination unit for discriminating bills and a check discrimination unit for discriminating checks.

9. The automated teller machine of claim 1, further comprising:

an additional storage box in which counterfeit banknotes are stored among the rejected banknotes temporarily held in the rejected banknote temporary holding unit.

10. The automated teller machine of claim 9, wherein when a customer cancels a deposit, uncollected banknotes that are stacked in the bundle storage unit but not collected by the customer are stored in the additional storage box.

11. An automated teller machine comprising:

an upper body;

an upper module which is at least partially accommodated within the upper body and includes an upper conveyance path for paper mediums to be deposited, discriminated, and sorted;

a lower body supporting the upper body; and a lower module which is detachably accommodated within the lower body and in which at least some of the paper mediums sorted in the upper module is conveyed and stored;

wherein the lower module includes:

a cassette accommodation frame detachably accommodated within the lower body;

a lower conveyance path connected to the upper conveyance path to receive the paper mediums from the upper module;

a lower conveyance module which opens and closes an open surface of the cassette accommodation frame and in which at least a portion of the lower conveyance path is disposed; and a cassette which is detachably accommodated inside the cassette accommodation frame through the open surface of the cassette accommodation frame and connected to the lower conveyance path to store the paper mediums, the cassette including a cassette body for storing the paper mediums and a cassette opening/closing door configured to open and close an open surface of the cassette body, and wherein a direction in which the cassette is detachably accommodated inside the cassette accommodation frame and a direction in which the cassette opening/closing door opens and closes the open surface of the cassette body are different from each other.

12. The automated teller machine of claim 11, wherein the lower conveyance module opens and closes an open upper surface of the cassette accommodation frame, and the cassette accommodation frame accommodates the cassette detachably in an up-down direction through the open upper surface of the cassette accommodation frame.

13. The automated teller machine of claim 12, wherein the cassette opening/closing door is configured to be rotatable about a rotation axis extending in the up-down direction to open and close the open surface of the cassette body.

14. The automated teller machine of claim 12, wherein the cassette body has an open peripheral surface between an upper surface and a lower surface, and the cassette opening/closing door opens and closes the open peripheral surface.

15. The automated teller machine of claim 12, wherein the lower conveyance module is rotatably connected to the cassette accommodation frame to open and close the open upper surface of the cassette accommodation frame.

16. The automated teller machine of claim 11, wherein the lower conveyance module further includes an additional storage box for storing the paper mediums.

17. The automated teller machine of claim 16, wherein in the additional storage box, a counterfeit banknote sorted in the upper module is stored.

18. The automated teller machine of claim 17, wherein in the additional storage box, an uncollected banknote sorted in the upper module is further stored.

19. The automated teller machine of claim 11, wherein the cassette includes a plurality of storage spaces arranged in an up-down direction and configured to be partitioned from each other.

* * * * *